(12) United States Patent
Valera et al.

(10) Patent No.: US 9,310,566 B2
(45) Date of Patent: Apr. 12, 2016

(54) OPTICAL WAVEGUIDES

(71) Applicant: BAE SYSTEMS plc, London (GB)

(72) Inventors: Mohmed Salim Valera, Rochester (GB); Michael David Simmonds, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 14/398,858

(22) PCT Filed: Mar. 18, 2013

(86) PCT No.: PCT/GB2013/050681
§ 371 (c)(1),
(2) Date: Nov. 4, 2014

(87) PCT Pub. No.: WO2013/144565
PCT Pub. Date: Oct. 3, 2013

(65) Prior Publication Data
US 2015/0086163 A1 Mar. 26, 2015

(30) Foreign Application Priority Data
Mar. 27, 2012 (GB) .................................. 1205383.1

(51) Int. Cl.
*G02B 6/34* (2006.01)
*F21V 8/00* (2006.01)

(52) U.S. Cl.
CPC ................ *G02B 6/34* (2013.01); *G02B 6/0035* (2013.01); *G02B 6/0065* (2013.01)

(58) Field of Classification Search
CPC .............. G02B 6/124; G02B 6/02085; G02B 6/12007; G02B 6/34; G02B 2006/12107; G02B 5/1861; G02B 6/29308; G02B 6/29326; C03C 25/18; C03C 25/106; C03C 25/12; G01J 3/18

USPC .................... 385/7, 12, 31, 39–41; 427/163.2
See application file for complete search history.

(56) References Cited

U.S. PATENT DOCUMENTS 4,799,750 A * 1/1989 Miyawaki ........................ 385/7
5,623,561 A * 4/1997 Hartman ......................... 385/12
(Continued)

FOREIGN PATENT DOCUMENTS

EP 2244114 A1 10/2010
JP H03-68988 A 3/1991
(Continued)

OTHER PUBLICATIONS

International Search Report and Written Opinion dated Jun. 21, 2013 issued in PCT/GB2013/050681.
(Continued)

*Primary Examiner* — Ellen Kim
(74) *Attorney, Agent, or Firm* — Scully, Scott, Murphy & Presser, P.C.

(57) ABSTRACT

An optical waveguide (2) arranged to transmit light under total internal reflection has a first diffractive grating region (8) arranged to receive light and diffract the received light along the optical waveguide (2), an intermediate diffraction grating (10) optically coupled to the first diffractive grating region (8) arranged to expand received light in a first dimension and a second diffractive grating region (9) optically coupled to the intermediate diffraction grating (10) arranged to expand light in a second dimension, orthogonal to the first dimension and to output the light expanded in the first and second dimensions from the optical waveguide (2) by diffraction. The first and second diffractive grating regions (8,9) are fabricated as a common grating whereas the second grating is fabricated above the common grating in an area where the common grating is erased by a coating.

29 Claims, 8 Drawing Sheets

(56) References Cited

U.S. PATENT DOCUMENTS

| | | | |
|---|---|---|---|
| 5,835,643 A * | 11/1998 | Fukumoto et al. | 385/7 |
| 7,573,640 B2 * | 8/2009 | Nivon | G02B 5/1814 345/7 |
| 8,548,290 B2 * | 10/2013 | Travers | G02B 27/01 359/34 |
| 2004/0062502 A1 * | 4/2004 | Levola | G02B 5/1866 385/129 |
| 2006/0228073 A1 | 10/2006 | Mukawa et al. | |
| 2008/0310284 A1 * | 12/2008 | Takada | G02B 3/08 369/112.07 |
| 2011/0076395 A1 | 3/2011 | Sun et al. | |
| 2012/0064303 A1 | 3/2012 | Yashiki et al. | |

FOREIGN PATENT DOCUMENTS

| | | |
|---|---|---|
| JP | H04-107277 U | 9/1992 |
| JP | H06-51683 A | 2/1994 |
| WO | WO 2006/064334 A1 | 6/2006 |
| WO | WO 2010/122329 A1 | 10/2010 |
| WO | WO 2010/122330 A1 | 10/2010 |

OTHER PUBLICATIONS

International Preliminary Report on Patentability dated Oct. 9, 2014 issued in PCT/GB2013/050681.

UK Search Report dated Jul. 9, 2012 issued in GB1205383.1.

Newport Corporation, "Diffraction Grating Handbook, Chapter 9", Jan. 1, 2005, pp. 1-20, retrieved from the Internet: URL:http://gratings.newport.com/library/handbook/chapter9.asp, retrieved on Jun. 5, 2013.

Max Born and Emil Wolf , Principles of Optics, 7th (expanded) edition, (Cambridge University Press, )—ISBN: 0521642221, 1999, pp. 724-726.

\* cited by examiner

Diffractive Efficiency

Fig. 5B

Un-diffracted Intensity

Fig. 5C

Diffracted Intensity Output

Fig. 6

$f(\vec{s}_2, \vec{s}_1) = f(-\vec{s}_1, -\vec{s}_2)$

OPTICAL WAVEGUIDES

The invention relates to an optical waveguide such as, but without limitation to, an optical waveguide for displays, to a display device and a method of manufacturing an optical waveguide. In particular, the invention is relevant to a display device in which image-bearing light is injected into a waveguide, is expanded to form a visible image and is released from the waveguide for viewing.

Prior art display devices of this type comprise a slab waveguide containing one single and continuous diffraction grating in which three separate areas of the diffraction grating perform a respective one of three successive functions. A first area serves as a light input area for diffracting received light along the slab waveguide. A second area serves to expand the light from the first area in a first dimension, and a third area serves to receive the expanded light and further expand the light in a second dimension orthogonal to the first dimension and to output the result from the waveguide.

However, in order that the second area may receive the input light from the first area, the light emanating from the first area must be reflected back towards the second area. Furthermore, in order that the third area may receive the expanded light from the second area, the expanded light emanating from the second area must be reflected back towards the third area. A highly reflective surface must be provided along parts of two edges of the slab waveguide in order to achieve this.

The reflective surfaces must be manufactured to very high optical standards if they are to be of use. Polishing of a reflective slab edge to a very flat surface is required. This is difficult to achieve and such waveguides are expensive to produce.

At its most general, the invention is the provision of two functioning diffraction gratings from different regions of one common grating structure in an optical waveguide optically coupling them via a separate intermediate diffraction grating. The intermediate diffraction grating may be positioned, aligned or oriented as desired relative to the common grating structure to achieve the desired optical couplings. Other parts of the common grating structure are rendered diffractively non-functioning. Thus, three separate regions or areas gratings may be provided from two separate grating structures. One of the two gratings of the common grating structure may be an input grating for receiving light input into the waveguide and directing it along the waveguide by diffraction. The other of the two gratings of the common grating structure may be an output grating for receiving light guided to it by the waveguide and directing the light out of the waveguide by diffraction.

The intermediate grating may receive light from the input grating and deviate at least some of that light towards the output grating to be output from the waveguide. There is no need for a reflective edge in the waveguide. Manufacturing is greatly simplified and optical performance is enhanced. The input and output gratings need not be aligned to a reflective edge, nor is a reflective edge required to be polished flat or otherwise optically optimised.

The intermediate diffraction grating may, by diffraction, spatially expand or spread light it receives from the input grating along a direction generally parallel to the plane of the intermediate diffraction grating. For example, light across different parts of the intermediate diffraction grating may be deviated by the intermediate diffraction grating in a common direction towards the output grating in unison from a multitude of different successive positions ranged along the intermediate diffraction grating. Light input to the intermediate diffraction grating as a beam or ray of light may output as a sheet of light, or the like, as a result of the expansion.

One of the two gratings of the common grating structure may be adapted for receiving expanded light and may have a surface area larger than that of the other of the gratings of the common grating structure adapted for directing light into the intermediate diffraction grating for expansion. As a result, when the light in question is image-bearing light, a relatively narrow input beam or pencil of light input to the waveguide may be output as a wider image-bearing beam.

In a first of its aspects, the invention may provide an optical waveguide including an optical waveguide arranged to transmit light under total internal reflection, a first diffractive grating region associated with the optical waveguide and arranged to receive light and diffract the received light along the optical waveguide and an intermediate diffraction grating associated with the optical waveguide and optically coupled to the first diffractive grating region by the optical waveguide, arranged to receive light diffracted from the first diffraction grating and to expand the received light in a first dimension by diffraction and a second diffractive grating region associated with the optical waveguide and optically coupled to the intermediate diffraction grating by the optical waveguide arranged to receive light expanded in the first dimension by the intermediate diffraction grating, to expand the received light in a second dimension orthogonal to the first dimension by diffraction and to output the light expanded in the first and second dimensions from the optical waveguide by diffraction wherein the first diffractive grating region and the second diffractive grating region are diffractive regions of a common grating and the common grating and the intermediate diffraction grating are separate integers. As a result, the intermediate diffraction grating may be positioned, aligned or oriented as desired relative to the first and second diffractive grating regions to achieve the desired optical couplings.

Furthermore, the nature of the structure of the first and second diffractive grating regions is determined by the nature of the common grating structure from which they both arise. Alignment between the first and second diffractive grating regions (e.g. groove alignment) occurs automatically as a natural consequence of their shared origin.

The second diffractive grating region and the first diffractive grating region may share a substantially identical grating structure, or preferably if the first and second diffractive regions are each blazed grating structures, the second diffractive grating region may be blazed in the opposite sense to the blazing of the first diffractive grating region. This reverse blazing enables light at the second diffractive region to be diffracted from that region in a direction generally reverse to the incoming direction of light originally input to the optical waveguide at the first diffractive grating region. This is desirable if the waveguide is to be used as a "see-through" display for displaying an image via the diffraction processes described above such that the user may still be able to view the environment (e.g. the world at large) visible through the optical waveguide. An example would be a head or helmet mounted display or a head up display in a vehicle cockpit or the like. The blazing structure of the blazed first and second diffractive grating regions may be selected to preferentially diffract light into a selected order of diffraction. Preferably the preferential order is the first diffraction order ($m=+1$ or $m=-1$). The first and second diffractive grating regions may be separated by non-diffractive regions of the common grating. The intermediate diffraction grating may be located at or over the non-diffractive regions of the common grating. Preferably, the common grating includes a substantially non-diffractive grating region comprising parts of the common grating processed to substantially suppress diffraction thereby. The process may retain the grating structure of the processed parts of the common grating while modifying the optical properties of the processed parts. Alternatively, the process may modify the grating structure of the common grating at the processed parts.

For example, the substantially non-diffractive grating region may have an optically transmissive coating which substantially suppresses diffraction by the parts of the common grating coated thereby. Desirably, the optically transmissive coating has a refractive index which substantially matches the refractive index of the material forming the common grating.

An optical cement is an example of a material suitable for use as a coating one could use to index-match the common grating. The common grating may be formed using an optical cement and this may be the same optical cement as may be used for the coating.

The second diffractive grating region may have an optical coating having a refractive index which differs from the refractive index of the material of the common grating. The first diffractive grating region may have an optical coating having a refractive index which differs from the refractive index of the material of the common grating. The optical coating of the first and/or second diffractive grating region may define a reflection grating structure there. That is to say, a discontinuity of refractive index may be provided (and preferably secured) thereby to enhance the reflectivity of the optically coated parts and in doing so enhance diffractive efficiency. The optical coating of the second diffractive grating region and/or of the first diffractive grating region may be over-coated by the optically transmissive coating. Thus, the optically transmissive coating may serve to protect the optical coatings applied to define the first and second diffractive grating regions.

A metallic coating may be employed as the optical coating (e.g. Silver, or other suitable metallic coating). However, metallic coatings tend to be absorbent, and this may not be desirable is some circumstances. Alternatively, a dielectric optical coating may be used, e.g. being selected from known dielectric optical coatings. Dielectric coatings tend to be far less absorbing than metallic coatings and may be used when that property is desirable (e.g. diffraction by transmission). Materials such as $TiO_2$ or $MgFl$ may be used either alone or in combination as a multi-coating or the like. For example, $TiO_2$ may be employed to coat the second diffractive region by a layer sufficiently thin to be highly transmissive thereby enabling the user to see the world at large behind the second diffractive grating region overlaid on a real world scene observed through the second diffractive region. Alternatively, the $TiO_2$ layer may be sufficiently thick to be very reflective (e.g. substantially fully reflective) if desired either at the first diffractive grating region and/or the second diffractive grating region.

The optical waveguide may comprise a laminate of layers of optically transmissive material within which some or all of the common grating is contained wherein one of the layers of optically transmissive material bears the common grating. A first of the layers may bear the common grating structure while a second of the layers may bear the intermediate diffraction grating. The first layer may be formed upon (or from) a high-index optical glass (e.g. N-SF6 Schott glass). The second layer may be formed upon a high-index optical glass (e.g. N-SF6 Schott glass), which may be separate from the optical glass upon (or from) which the first layer is formed. The first layer and/or the second layer may be formed from a resin (e.g. epoxy), or optical cement. Either layer may comprise (or be provided by) an optically transmissive coating as described above. The resin or cement may be bonded to the surface parts of the first layer. This bonding may be by direct contact or may be via an intermediate layer of resin (e.g. epoxy) optical cement. The optical coatings described above may be formed on the first layer. An optical coating, such as described above, may be formed on the second layer upon the intermediate diffraction grating.

The external surface of the optically transmissive coating is preferably substantially coplanar with an opposite surface of the optical waveguide. In this way, the waveguide may be of substantially uniform thickness. The waveguide may be a planar waveguide such as a slab waveguide. It may be elongated with the first diffractive grating region, the intermediate diffraction grating and the second diffractive grating region arrayed one after the other in a direction along the long axis of the waveguide. This elongate arrangement is suited for use of the waveguide in a helmet-mounted display apparatus or head-up display apparatus. The second diffractive grating region may form a display surface or element.

The intermediate diffraction grating may be located between the first and second diffractive grating regions. Preferably, the intermediate grating may be located on or over non-diffractive parts of common grating. For example, the intermediate diffraction grating and parts of the common grating coated by the optically transmissive coating may overlap. Due to the absence of diffraction by the non-diffractive parts of the common grating, those regions of the waveguide become free for other functions such as bearing the intermediate diffraction grating. This assists in enabling a more compact, or thinner, waveguide shape for a required size of grating structures.

The intermediate diffraction grating may be coated with an optical coating arranged such that diffractive efficiency of the intermediate grating varies across the grating. The coating may be such that diffractive efficiency is highest at those parts of the intermediate diffraction grating adjacent to the first diffractive grating region arranged to initially receive light from the first diffractive grating region. This may serve to enable the intermediate diffraction grating to efficiently diffract (i.e. deviate) received light across the intermediate diffraction grating to be expanded thereby. The coated parts of highest diffractive efficiency may define an area having substantially the same size and/or shape as the first diffractive grating region. The intermediate grating may have a highly reflective coating at those parts (e.g. Silver, or a dielectric). Other parts of the intermediate diffraction grating may be coated to have a relatively lower diffractive efficiency.

These other parts may be coated so that their diffractive efficiency rises with increasing distance along the intermediate diffraction grating in the direction of the aforementioned dimension of expansion of light by the intermediate diffraction grating. In this way, the proportion of optical energy deviated towards the second diffractive grating region by diffraction in the intermediate diffraction grating, may controllably increase as light passes across the intermediate diffraction grating.

The intermediate diffraction grating may be a surface relief grating formed in a surface of the optical waveguide. The first diffractive grating region and the second diffractive grating region may each be a relief grating.

The intermediate grating may be formed within the body of the waveguide or upon its surface. For example, the common grating may be formed in or upon a surface of first optical substrate (e.g. a glass substrate) and the intermediate grating may be formed in or upon a second optical substrate (e.g. a glass substrate). The first and second optical substrates may be optically joined or bonded by an optical resin (e.g. epoxy) or cement with the common grating structure sandwiched between the first and second optical substrates, and with the intermediate grating either (a) also sandwiched between the first and second optical substrates, or (b) disposed upon an outwardly-presented surface of the second optical substrate. For example, in option (a), the intermediate grating may be disposed on an inwardly-presented surface of the second optical substrate which faces/opposes an inwardly-presented surface of the first optical substrate upon/within which the common grating is formed. According to option (b) the grating structures may all be internally disposed within the structure of the waveguide, whereas with option (a), the intermediate grating may be disposed on an outer surface of the waveguide structure.

The common grating may comprise a blazed grating structure. The benefits of blazing include the ability, through suitable selection of blazed structure, to ensure that the diffracted order of interest (e.g. $1^{st}$ order) is substantially unidirectional—namely, emanates from one side of the grating structure in question. Furthermore, by suitably blazing, a high proportion of diffracted light energy may be directed into the order of interest. The first diffractive grating region and the second diffractive grating region of the common grating may each be blazed. The orientation of the blazing may also be selected to select the direction in which diffracted light is output from the waveguide relative to the direction it is input to the waveguide. For example, if the orientation of the blazing applied to the second diffractive grating region is generally opposite to orientation of the blazing applied to the first diffractive grating region, the result is that light is output in a direction substantially opposite to the input direction (e.g. output from the same side of the waveguide as it was input). Conversely, by selecting generally the same orientation of blazing may enable the waveguide to output light from a side of the waveguide opposite to the input side.

The intermediate diffraction grating may comprise a square-wave grating structure (e.g. binary). This has the benefit of allowing access to light diffracted by the grating into both the positive and the negative diffraction orders, without preference. This renders the process of expanding the light within the intermediate waveguide more efficient as both types of diffraction order contribute substantially equally to the process.

The second diffraction grating region and first diffraction grating region may share a substantially identical grating structure.

The first dimension, in which light is expanded by the intermediate grating, may be a dimension in the plane of the waveguide when a planar waveguide. The second diffractive grating region may be arranged to receive the expanded light from the intermediate diffraction grating and to expand the received light in a second dimension transverse (e.g. orthogonal) to the first dimension.

In a second aspect, the invention may provide a display device, such as a head-up display or a helmet-mounted display or other, including the optical waveguide described above.

In a third aspect, the invention may provide a method of manufacturing an optical waveguide including forming a common grating in an optical substrate, applying a process to the common grating to define a first diffractive grating region and a second diffractive grating region which are diffractive regions of the common grating, and forming as part of the optical waveguide an intermediate diffraction grating which is separate from the common grating and which is optically coupled to the first and second diffractive grating regions via the optical waveguide. In this manner, the common grating and intermediate diffraction grating are separately defined integers.

Desirably, the first diffractive grating region is arranged to receive light and diffract the received light along the optical waveguide, and the intermediate diffraction grating is arranged to receive diffracted light from the first diffractive grating region and to expand the received light in a first dimension by diffraction, and the second diffractive grating region is arranged to receive the light expanded in the first dimension and expand the light in a second dimension orthogonal to the first dimension by diffraction and to output the received expanded light from the optical waveguide by diffraction.

The method may include applying the process to parts of the common grating to substantially suppress diffraction by the processed parts and to define the first and second diffractive grating regions of the common grating as other than the processed parts.

The process may include coating the parts of the common grating with an optically transmissive material therewith to substantially suppress diffraction by the coated parts.

The optically transmissive coating may have a refractive index which substantially matches the refractive index of the material of the common grating.

The method may include coating the first diffractive grating region of the common grating with an optical coating having a refractive index which differs from the refractive index of the material of the common grating.

The method may include coating the second diffractive grating region with an optical coating having a refractive index which differs from the refractive index of the material of the common grating.

In the method, the optical coating of the second diffractive grating region may be over-coated with the optically transmissive coating. The optical coating of the first diffractive grating region may be over-coated with the optically transmissive coating.

The method may include forming the intermediate diffraction grating to overlap processed parts of the common grating. The intermediate diffraction grating may be formed as a surface relief grating. The common grating may be formed as a surface relief grating. The method may include forming the common grating by a process applied in unison to the first and second diffractive grating regions substantially simultaneously.

To better illustrate the invention there now follows, by way of a non-limiting example, a description of preferred embodiments described with reference to accompanying drawings of which.

In the drawings, like articles are assigned like reference symbols.

Figure 1A:
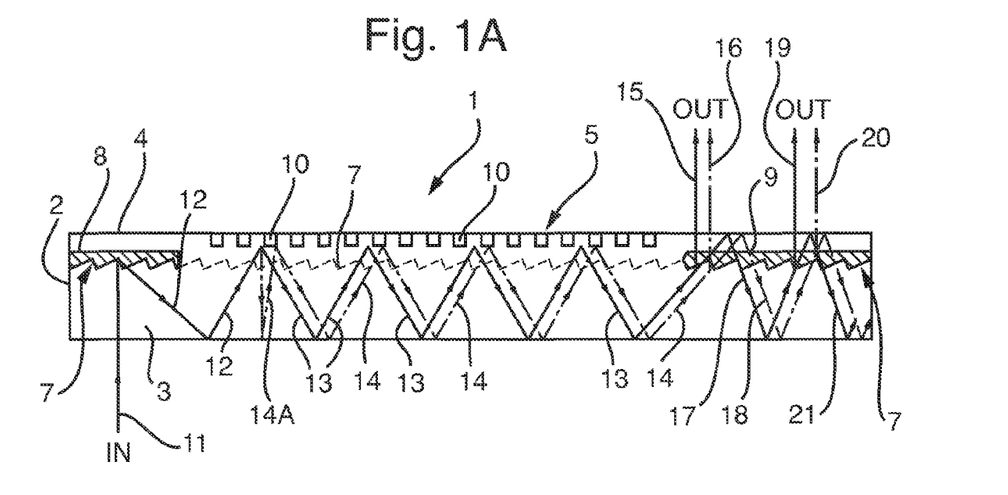
FIG. 1A schematically illustrates an optical waveguide according to an embodiment of the invention, in cross section.
Figure 1B:
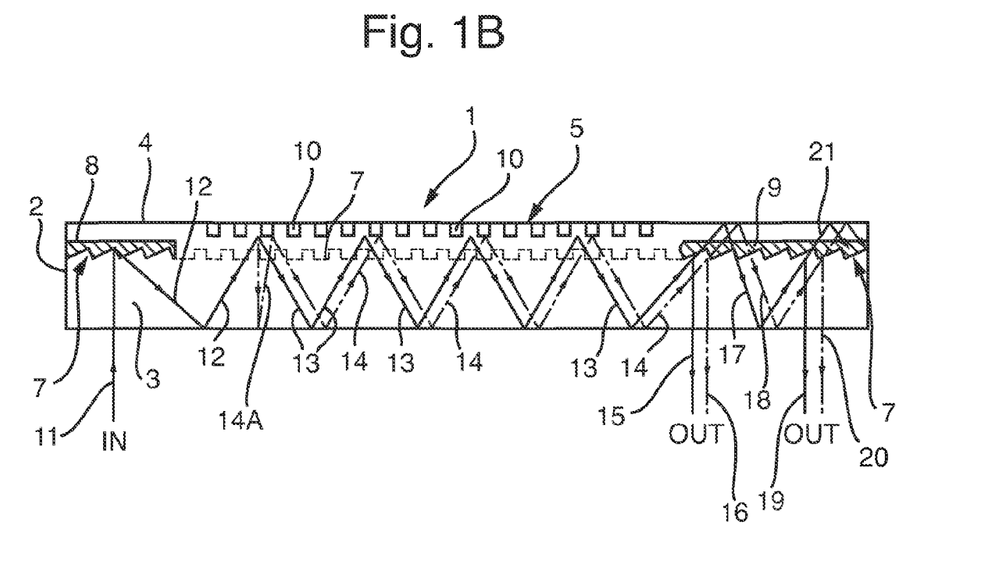
FIG. 1B schematically illustrates an optical waveguide according to another embodiment of the invention, in cross section.

FIGS. 1A and 1B schematically illustrate, in cross section, an optical waveguide (1) according to a respective one of two embodiments of the invention.

The optical waveguide comprises a rectangular optical slab (2) formed as a laminate of two optically transmissive substrates (3, 4). Each of the two substrates presents a planar surface defining one of two mutually parallel faces at opposite sides of the waveguide. The two faces are spaced from one another by the thickness of the optical slab. The optical slab is arranged to guide light internally by successive total internal reflections at each of the two planar surfaces alternately.

The first optical substrate is formed from a high-index optical glass (e.g. N-SF6 Schott glass), and the second optical substrate is formed from an optical cement (e.g. resin, such as an epoxy resin or the like).

In the embodiment of FIG. 1A, an internal surface of a first of the two optically transmissive substrates (3) presents a blazed surface relief grating structure (7) which extends substantially along the entire length and width of the first substrate. In the embodiment of FIG. 1B, an internal surface of a first of the two optically transmissive substrates (3) presents a surface relief grating structure (7) which is blazed at its end regions and is binary between those end regions. The direction or orientation of blazing of the grating structure at one of its end regions is opposite to that of the blazing at its other end region. The surface relief grating structure extends substantially along the entire length and width of the first substrate. A method of manufacturing such a structure is described below with reference to FIGS. 4F to 4S.

A first circular region (see FIG. 2) of the grating structure adjacent to a first end of the optical slab is coated with a coating (8) of reflective material (e.g. $TiO_2$, or Silver) and defines a region of high reflectivity which enhances the diffractive efficiency of the grating structure there. This defines a first diffractive region of the grating structure. In both of the embodiments shown in FIGS. 1A and 1B, the first diffractive grating region is blazed.

Adjacent to a second end of the optical slab, a second circular region (9) of the grating structure is coated with reflective material (e.g. $TiO_2$). This optically reflective coating also enhances the diffractive efficiency of the second region of the grating structure, and defines a second diffractive region of the grating structure. In both of the embodiments shown in FIGS. 1A and 1B, the second diffractive grating region is blazed, in opposite senses respectively. The result is that in the embodiment of FIG. 1A, the second diffractive region diffracts light out of the optical waveguide in a direction generally opposite to the direction in which the blazed grating of the second diffractive region of FIG. 1B does so.

The second of the two optical substrates (4) is formed as a coating overlying the entirety of the grating structure of the first optical substrate (7) including the first and second diffractive regions already coated with the reflective coating (8, 9). The material of the second optical substrate substantially wholly fills the grooves of the (blazed or binary) grating structure at all those parts which are not already coated by the aforementioned reflective coatings.

The refractive index of the first optical substrate (3) differs from the refractive index of the material forming the reflective coatings at the first and second diffractive regions (8, 9). For example, the reflective coatings may be $TiO_2$ having a refractive index of 2.4 (for light of 550 nm wavelength) whereas the first substrate (3) may be a Silica glass ($SiO_2$) having a refractive index of 1.46 (for light of 550 nm wavelength). Of course, this difference of refractive indices at the interface between the two materials results in enhanced optical reflectivity there.

Conversely, the refractive index of the second optical substrate substantially matches the refractive index of the material of the first optical substrate.

As a consequence of this, while the diffractive efficiency of the blazed grating structure at the first and second diffractive regions is enhanced, the diffractive efficiency of all other regions of the grating structure, coated by the second optical substrate material, is substantially wholly suppressed.

This suppression of diffraction is schematically represented in FIG. 1 in terms of a dotted-line representation of the (blazed or binary) grating structure (7) between the diffractive regions (8, 9).

A square-wave (binary) surface relief grating structure (10) is formed in the planar face (5) of the second optical substrate intermediate the first (8) and second (9) blazed diffractive regions of the grating structure (9) covered by the second optical substrate. This intermediate diffraction grating overlays those regions of the (blazed or binary) grating structure (7) which are coated by the material of the second optical substrate and which have substantially no diffractive effect. Consequently, light guided by the waveguide is able to reach the intermediate diffraction grating (10) from within the optical waveguide by passing across the diffraction-suppressed (blazed or binary) grating structure (7) from the first optical substrate to the second optical substrate substantially undiffracted, and then continue onwards to the intermediate diffraction grating for diffraction there.

Thus, whilst the optical waveguide illustrated in FIG. 1 effectively comprises three separate and separated optically diffractive grating regions, those being the first and second blazed diffractive regions of the grating structure (8, 9) and the intermediate binary diffraction grating (10), the waveguide comprises only two individual grating structures. The two grating structures are, of course, the common grating structure (7) (wholly blazed in FIG. 1A or part blazed and part binary in FIG. 1B) which is common to both of the first and second blazed diffractive regions, and the separate intermediate diffraction grating.

In use, light (11), such as image-bearing light, is input into the optical slab waveguide (2) in a direction substantially perpendicular to the exterior planar surface of the first optical substrate (3) at a location in register with the first diffractive region (8) of the grating structure (7). Upon propagating into the first optical substrate, the input light strikes upon the first diffractive region whereupon it is diffracted into a first order (m=1 or −1) of diffraction (12) by the first diffractive region. The angle at which the first order diffracted beam emerges from the first diffractive region is such that the diffracted beam (12) subsequently traverses back across the first optical substrate obliquely towards the exterior planar surface of that substrate which it strikes internally. The internal angle of incidence of the beam is sufficiently high to ensure total internal reflection. Consequently, the internally reflected and diffracted beam (12) once more traverses the first optical substrate, passing obliquely through the diffraction-suppressed regions of the (blazed or binary) grating structure (7) and subsequently entering the second optical substrate whereupon it strikes the intermediate diffraction grating (10) obliquely.

The grating grooves of the intermediate diffraction grating are uniform and mutually parallel, but are aligned at an angle which is oblique to the linear direction of the grooves of the (blazed or binary) grating structure (7) of the first optical substrate.

The angle at which the grooves of the intermediate grating linearly extend across the waveguide, relative to the orientation of the linear grooves of the common grating structure (7), is suitably a value between 45 degrees and 60 degrees, but may be outside this range. The pitch of the grooves of the intermediate grating may be a value in the range 350 nm to 450 nm. The pitch of the grooves of the common grating structure (7) may be a value in the range 350 nm to 450 nm.

Consequently, upon striking the intermediate diffraction grating, the diffracted beam (12) undergoes a further diffraction. Part of the light emerging from the intermediate grating is a $0^{th}$-order diffracted beam (13; m=0), whereas a part is a first order diffracted beam (14A; m=+1 or m=−1) emerging in a different direction to the $0^{th}$-order beam. The first order diffracted beam (14A) is directed transversely to the direction of the $0^{th}$-order diffracted beam further along the intermediate diffraction grating in a direction transverse to the plane of the page containing the cross sectional view of FIG. 1. This direction is illustrated schematically by a dot-dashed light beam (14A) in the cross sectional view of FIG. 1, and is also shown in the plan view of FIG. 2. The consequence of this transverse deviation of light by the intermediate diffraction grating is to expand the light received by the intermediate diffraction grating in a dimension transverse to the direction of the $0^{th}$-order diffracted beam. This function of the intermediate grating means it may be considered as an example of what is referred to in the art as a "turning grating".

Both the $0^{th}$-order diffracted beam (13) and the first-order diffracted beam (14A) subsequently obliquely transverse the optical slab from one of its faces to the other and obliquely strike the exterior face of the first optical substrate (internally) at which point they each undergo total internal reflection which returns them upwardly to the intermediate diffraction grating (10). Here, each returned beam separately diffracts into a further $0^{th}$-order diffracted beam and a further first-order diffracted beam. Multiple such return paths subsequently occur in respect of all light beams guided along the optical waveguide between the intermediate diffraction grating and the coplanar exterior face of the first optical substrate. Ultimately, many such beams are guided in this way to the second diffractive region of blazed grating (9) whereupon each separately undergoes further diffraction. This further diffraction process serves to output light outwardly from the optical waveguide.

In particular, referring to the embodiment of FIG. 1A, upon striking the second diffractive region an incident beam, such as an incident $0^{th}$-order beam (14), is diffracted into a further $0^{th}$-order beam (17) and a further first-order beam (15). The further first-order diffracted beam (15) propagates from the output grating across the optical waveguide and internally strikes the exterior face of the second optical substrate substantially perpendicularly thereby to exit the waveguide without total internal reflection. Conversely, the further $0^{th}$-order beam (17) is simply redirected to the exterior surface of the first optical substrate by reflection from the surface of the second optical substrate whereupon, due to the angle at which it strikes that surface, it undergoes total internal reflection once more and returns to the second diffractive grating region (9) at a location further along the optical waveguide.

Another process of diffraction into a first-order beam and a $0^{th}$-order beam (19 and 21 respectively) takes place in the returned $0^{th}$-order beam in which only the first-order diffracted beam is output from the optical waveguide in manner described above. In this way, by retaining each $0^{th}$-order diffracted beam generated by the second diffractive grating region output grating, and redirecting that beam back towards the second diffractive grating region, a lateral expansion of the image-bearing light is achieved in a direction transverse to the expansion imposed by the intermediate diffraction grating.

Alternatively, referring to the embodiment of FIG. 1A, upon striking the second diffractive region an incident beam, such as an incident $0^{th}$-order beam (14), is diffracted into a further $0^{th}$-order beam (17) and a further first-order beam (15). The further first-order diffracted beam (15) propagates from the output grating across the optical waveguide and internally strikes the exterior face of the first optical substrate substantially perpendicularly thereby to exit the waveguide without total internal reflection. Similarly, the further $0^{th}$-order beam (17) is simply redirected to the exterior surface of the second optical substrate whereupon, due to the angle at which it strikes that surface, it undergoes total internal reflection once more and returns to the surface of the first optical substrate and thence back to the second diffractive grating region (9) at a location further along the optical waveguide.

Another process of diffraction into a first-order beam and a $0^{th}$-order beam (19 and 21 respectively) takes place in the returned $0^{th}$-order beam in which only the first-order diffracted beam is output from the optical waveguide in manner described above. In this way, by retaining each $0^{th}$-order diffracted beam generated by the second diffractive grating region output grating, and redirecting that beam back towards the second diffractive grating region, a lateral expansion of the image-bearing light is achieved in a direction transverse to the expansion imposed by the intermediate diffraction grating.

Consequently, the light guided through the optical waveguide is expanded in two transverse dimensions—a first dimension across the intermediate grating first, and a second dimension across the second diffractive grating region. The light input to the waveguide via the first diffractive grating region is preferably image-bearing light such that an expanded image is output from the waveguide via the second diffractive grating region for viewing by a user. In this way, the waveguide may provide a display function. It may be part of a head-up display apparatus or a helmet-mounted display.

It will be appreciated that the same process of diffraction into first-order and $0^{th}$-order diffracted beams at the output grating also takes place in respect of each one of the light beams which have been diffracted laterally in the intermediate diffraction grating and have subsequently been guided by the optical slab waveguide to the second diffractive grating region for output. The path of such a diffracted beam is represented by the dotted beam path (14) illustrated schematically in FIG. 1A and FIG. 1B, which undergoes diffraction into beams multiple separate beams (16, 18 and 20) at the second diffractive grating region (9).

Figure 2:
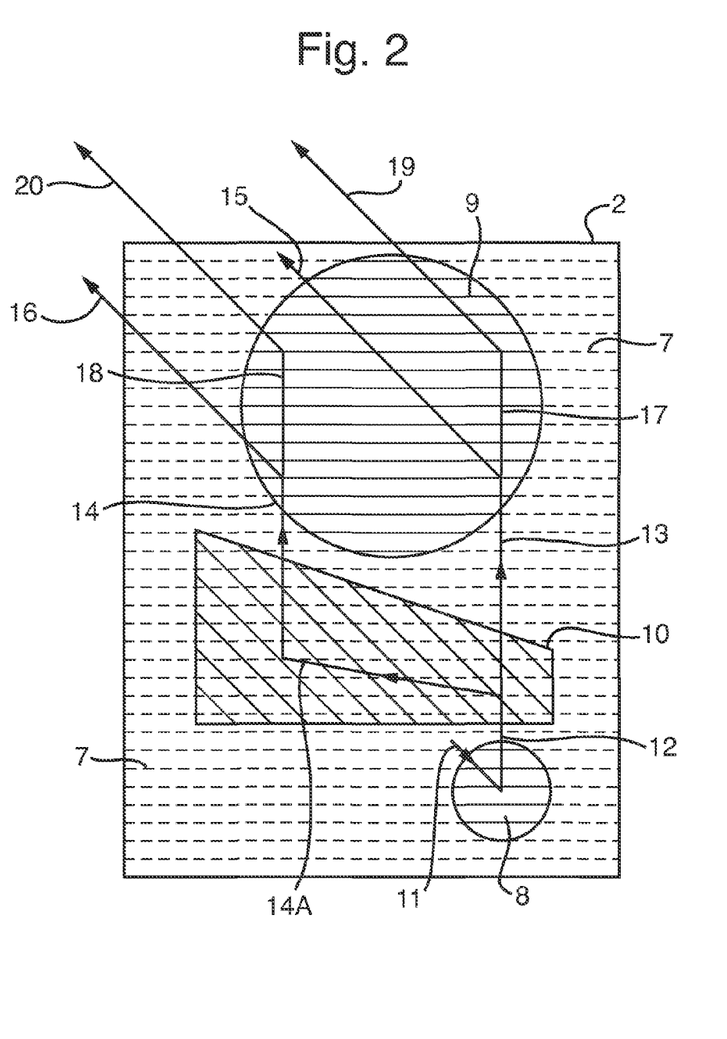
FIG. 2 schematically illustrates a plan view of the optical waveguide illustrated in FIG. 1.
Figure 3:
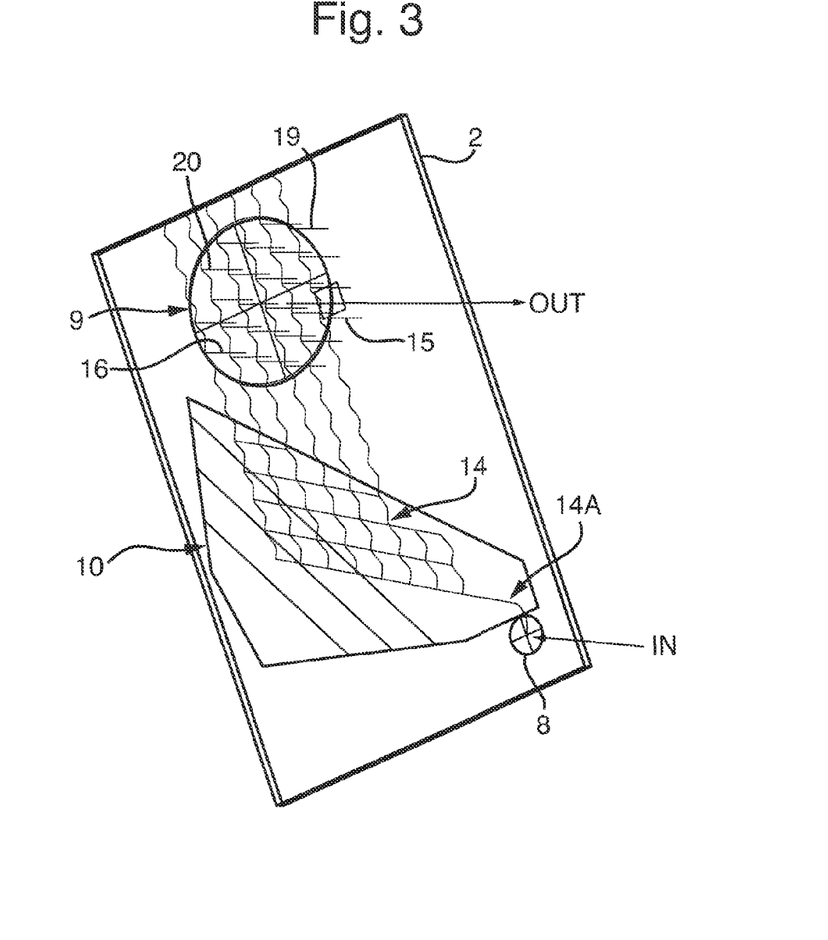
FIG. 3 illustrates a perspective view of an optical waveguide according to the invention comprising detailed schematic views of optical ray pathways.

FIG. 2 schematically illustrates these two extreme beam paths in plan view to better illustrate the lateral expansions occurring, according to the embodiment of FIG. 1B. Of course, only a limited number of light beams are illustrated in FIG. 2 for clarity, and the skilled person will appreciate that a great deal many more light beams and diffractions occur in reality. In particular, the schematic diagram of the optical waveguide illustrated in FIG. 3 illustrates in more detail the paths traversed by a plurality of light rays undergoing numerous diffraction events both at the intermediate grating at the output grating. The light input to the optical waveguide of FIG. 3, at the first diffractive grating region (8) is image-bearing light which bears the image of a cross as shown. The light subsequently output from the waveguide by the second diffractive grating region also bears this image in an expanded form as shown It will be appreciated that light is input to the optical waveguide at one exterior surface of the optical waveguide and is subsequently output from the opposite side of the waveguide. By reversing the orientation of the blazing of the second diffractive grating region relative to the orientation of the blazing on the first diffractive grating region, the output direction may be reversed such that light is output from the same side of the waveguide as it is input. This may make the waveguide better suited for e.g. helmet-mounted displays where the light source is on the same side of the waveguide as the viewer.

Furthermore, the embodiment of the invention illustrated in FIG. 3 employs an intermediate diffraction grating having a diffractive efficiency which varies spatially across the grating in a manner which differs from the spatial variation of the diffractive efficiency of the intermediate grating of the embodiment illustrated in FIGS. 1 and 2. In particular, the first diffractive grating region (8) of the embodiment illustrated in FIG. 3 is laterally off-set from the second diffractive grating region such that all the light output from the second diffractive grating region must have been initially turned by the intermediate diffraction grating (10) to account for the lateral offset. This is not so in the embodiment of FIGS. 1 and 2 in which at least some light (beam 13) reaches the second diffractive grating region without lateral deviation by the intermediate diffraction grating.

Nevertheless, such lateral deviation may be preferable in order to avoid the possibility of a light "hot-spot" appearing in the output/viewed image from the optical waveguide which could arise from a remnant proportion of light emanating from the input grating (8) passing through the intermediate grating without having been deviated/diffracted by that grating. Without lateral deviation of the input grating relative to the output grating (9), any such remnant light will be output by the output grating together with the expanded image light and be visible as a "hot spot" of light in the viewed image. Lateral offset as in FIG. 3 prevents any such remnant light reaching the output grating and thereby prevents such a "hot spot" occurring.

FIGS. 4A to 4E illustrate a sequence of stages by which the optical waveguide may be manufactured according to preferred embodiments of the invention.

Figure 4A:
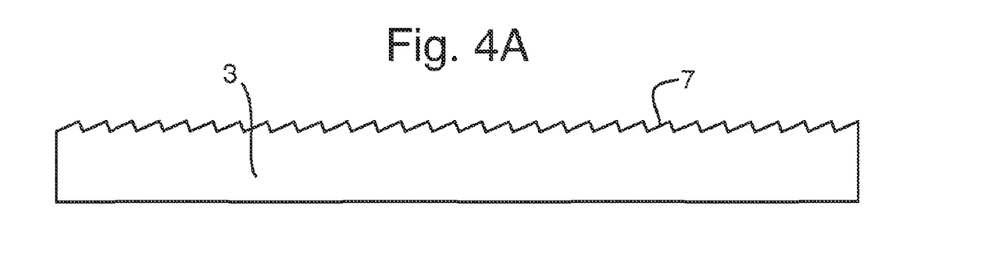
FIGS. 4A to 4E schematically illustrate successive stages in a first method of manufacturing an optical waveguide according to an embodiment of the invention.

The process of manufacture may begin with the provision of a first optical substrate (3) upon an upper surface of which is formed a blazed surface-relief diffraction grating. The blazed grating is formed over substantially the entirety of the upper surface. The grating may be formed by a process of etching or in the form of a replica grating (e.g. by a pressing process). The blazed grating structure (7) is generated by a process applied in unison to the first optical substrate (3) such that the structure of the grating can be substantially common to all parts of the grating.

Figure 4B:
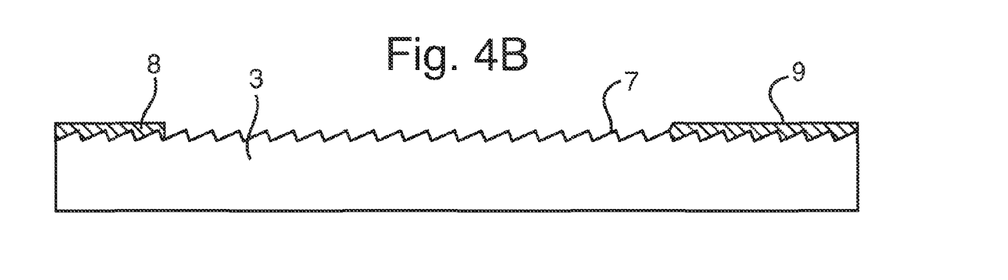

Subsequently, a first circular patch (8) of reflective coating material, such as Silver or a suitable dielectric (e.g. TiO$_2$), is applied to a circular region of the blazed diffraction grating e.g. adjacent to one end of the first optical substrate. This is to serve as a means of enhancing the diffractive efficiency of the blazed grating at that coated region. The coated region will define a first diffractive grating region diffraction grating as described above. A second circular region (9) of the blazed grating is also coated by a reflective material to define a second diffractive grating region e.g. adjacent to another end of the first optical substrate. Subsequently, the blazed grating structure is processed as follows.

Figure 4C:
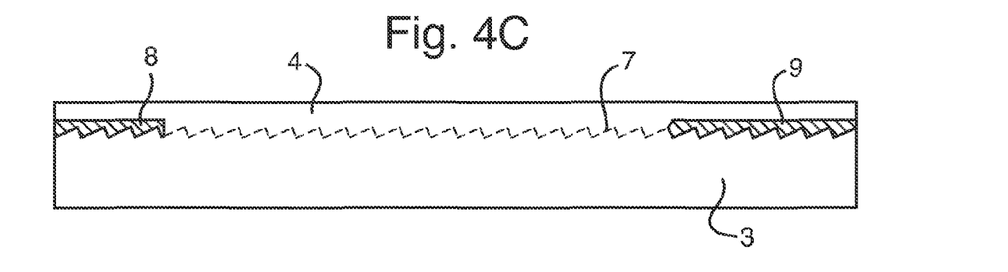

A second optical substrate (4) is applied as a coating over the blazed surface relief grating of the first optical substrate (3) and over the coated parts (8,9) of that blazed grating. The material of the second optical substrate (4) has a refractive index matching the material of the first optical substrate (3). As a result of this process, the diffractive efficiency of the parts of the blazed grating coated by the second substrate material becomes negligibly small. Of course, those parts (8,9) of the blazed grating protected from the second optical substrate (4) material by the reflective coatings retain a relatively high diffractive efficiency.

An alternative method of manufacture is shown schematically in FIGS. 4F to 4L.

Figure 4D:
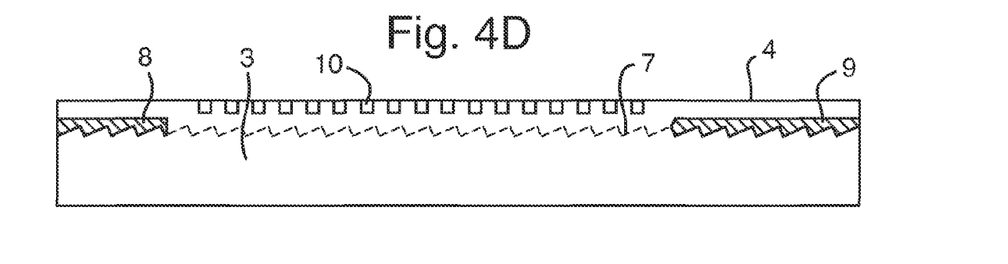
Figure 4E:
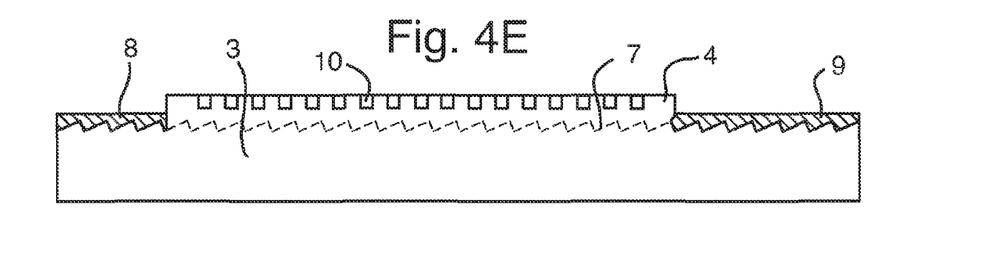
Figure 4F:
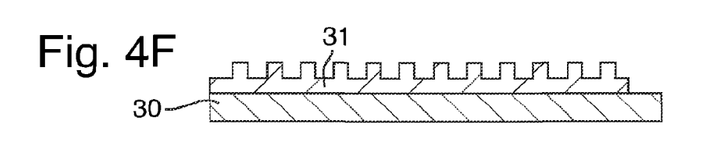
FIGS. 4F to 4L schematically illustrate successive stages in a second method of manufacturing an optical waveguide according to an embodiment of the invention.
Figure 4G:
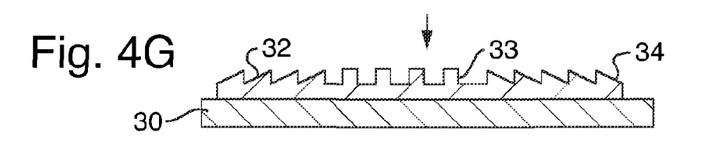

A binary master relief grating (31) is provided on a master substrate (30) as shown in FIG. 4F. The binary master is then modified as shown in FIG. 4G to render a first region of the binary structure a first blazed relief structure (32) and a second region of the binary structure a second blazed relief structure (34). Between the two blazed relief structures there remains a binary relief structure (33). The orientation or slant of the blaze of the first blaze relief structure is opposite, or reverse, to that of the second blazed relief structure.

Figure 4H:
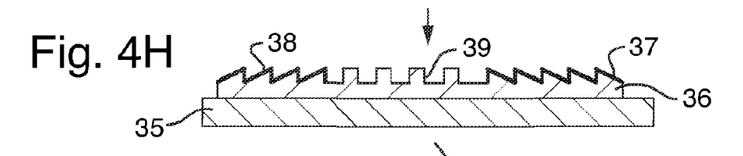

This blazed and binary master is then used to stamp a common single grating (36) into a layer of optical cement (e.g. resin, or glue) coating one surface of a waveguide glass substrate (35). Optical coatings (37, 38) are added, such as TiO$_2$, to the first and second blazed grating structures formed thereby, and no coating is added to the binary grating structure (39) formed between them, as shown in FIG. 4H.

Figure 4I:
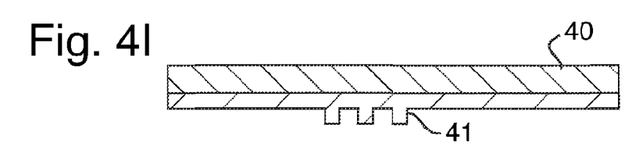
Figure 4J:
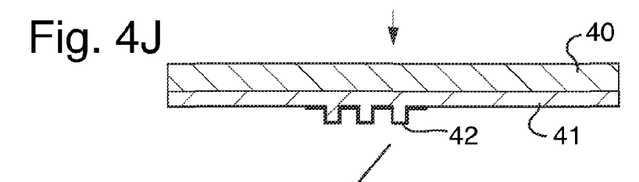

A separate binary grating (41) is formed (e.g. replicated) in a coating of optical cement (e.g. resin or glue) formed on a second waveguide glass substrate (40) as shown in FIG. 4I. An optical coating (42) is added, such as TiO$_2$, to the binary grating structure formed as shown in FIG. 4J.

Figure 4K:
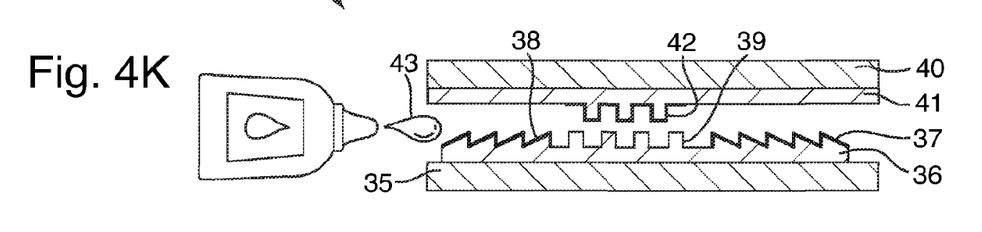

The second waveguide glass substrate, bearing the binary grating (42) is brought together with the first waveguide glass substrate bearing the blazed and binary common grating structure (37, 38, 39) such that the separate grating structures oppose each other in parallel across a spacing between them, with the optically coated binary grating (42) of the second waveguide glass substrate in register with the uncoated binary part of the common grating structure on the second waveguide glass substrate. This is shown in FIG. 4K.

Figure 4L:
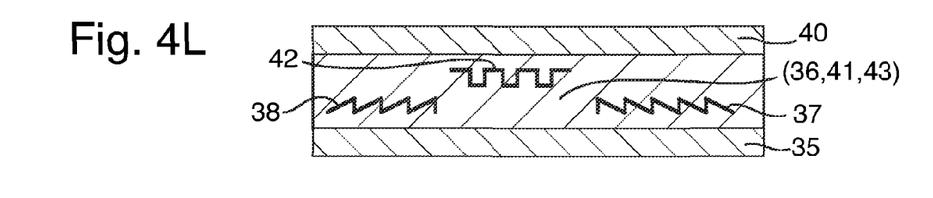
Figure 4M:
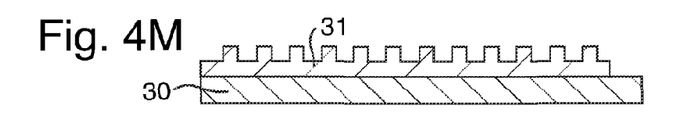
FIGS. 4M to 4S schematically illustrate successive stages in a third method of manufacturing an optical waveguide according to an embodiment of the invention.
Figure 4N:
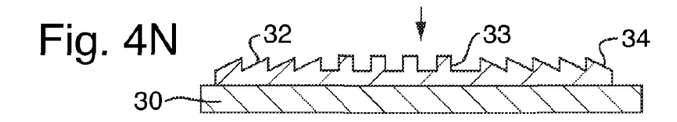
Figure 4O:
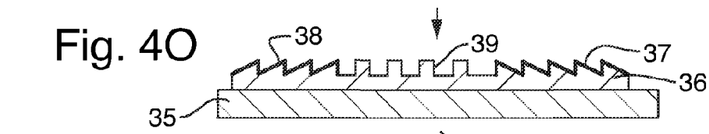
Figure 4P:
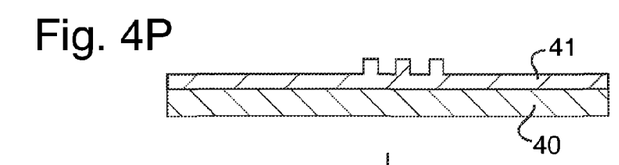
Figure 4Q:
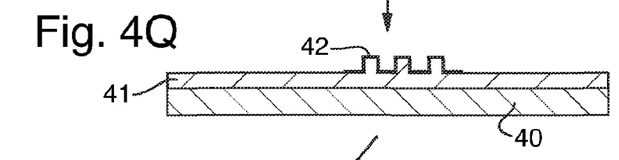
Figure 4R:
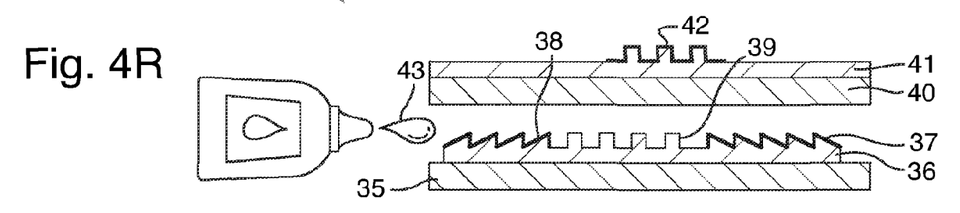

An optical cement (43) (e.g. resin, or glue) is then inserted into the spacing to fill it and to bond the two waveguide glass substrates together. The refractive index of the bonding cement matches that of the optical cement (36, 41) used to initially form the respective grating structures formed on those glass substrates. This is shown in FIG. 4L. The result of this last index-matching process applied to the common grating on the first waveguide glass substrate is that the diffractive efficiency of the uncoated binary grating structure (39) of the common grating structure on the first waveguide glass substrate is effectively substantially removed without having to physically remove that grating structure. Simultaneously, the diffractive efficiency of the three optically coated grating structures (37, 38, 42) is maintained by virtue of the optical coating applied to them.

FIGS. 4M to 4S show and alternative process in which the steps shown in FIGS. 4M to 4Q are substantially the same as those described above with reference to FIGS. 4F to 4J. However, the final steps shown in FIGS. 4R and 4S differ in that the second waveguide glass substrate, bearing the binary grating (42) is brought together with the first waveguide glass substrate bearing the blazed and binary common grating structure (37, 38, 39) such that the separate grating structures do not directly oppose each other. The two glass substrates are arranged in parallel with a spacing between them, and with the optically coated binary grating (42) of the second waveguide glass substrate in register with the uncoated binary part of the common grating structure on the second waveguide glass substrate. However, the optically coated binary grating in this example is located upon the surface of the second waveguide glass substrate facing away from the common grating structure on the first waveguide glass substrate, with the flat grating-free surface of the second waveguide glass directly opposing the common grating instead and, therewith, defines the spacing therebetween. This is shown in FIG. 4K.

Figure 4S:
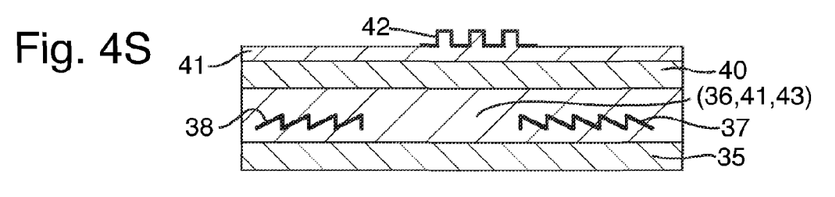

An optical cement (43) (e.g. resin, or glue) is then inserted into the spacing to fill it and to bond the two waveguide glass substrates together, as shown in FIG. 4S. The refractive index of the bonding cement matches that of the optical cement (36, 41) used to initially form the respective grating structures formed on those glass substrates. The result of this last index-matching process applied to the common grating on the first waveguide glass substrate is that the diffractive efficiency of the uncoated binary grating structure (39) of the common grating structure on the first waveguide glass substrate is effectively substantially removed without having to physically remove that grating structure. Simultaneously, the diffractive efficiency of the two blazed optically coated grating structures (37, 38) is maintained by virtue of the optical coating applied to them.

In all of these examples of methods of manufacture, a processes other than index matching could be applied to the common grating structure to render the relevant parts of the common grating non-diffractive. For example, an alternative process would be simply to physically remove the grooves of the common grating not forming either the first or second diffractive grating region by a process of polishing, etching or even scratching the relevant parts of the common grating structure to remove the unwanted parts and retain only those parts intended for use as the first and second diffractive grating regions.

Subsequently, as shown in FIG. 4D, an intermediate diffraction grating is formed in the exterior surface of the second optical substrate in a form of a square-wave surface relief grating. This may be performed by a pressing process, such as a replica grating, or by etching or other means as would be readily apparent to the skilled person. Alternatively, the intermediate diffraction grating may be formed as a holographic grating.

FIG. 4E shows an alternative method of manufacture in which the second optical substrate is applied only to those parts of the blazed grating formed on the surface of the first optical substrate which are not already coated by the reflective coatings.

An optical coating is applied non-uniformly to the intermediate diffraction grating so as to vary spatially the diffractive efficiency of the grating along a direction. The direction corresponds to the dimension in which the diffraction grating serves to expand light received from the first diffractive grating region (8).

The optical coating is applied to maximise the diffractive efficiency of those parts of the intermediate diffraction grating adjacent to the first diffractive grating region. It is those parts of the intermediate diffraction grating which are arranged to receive diffracted light from the first diffractive grating region.

The optical coating may be applied in varying thickness to implement a spatial variation in diffractive efficiency of the intermediate grating. For example, a $TiO_2$ coating may be applied having a considerable thickness (e.g. 30 nm or more) at those regions of the intermediate grating intended to initially receive light from the input grating (8), thickness of the coating subsequently falling rapidly to about 10 nm at an adjacent part of the intermediate grating where light begins to be expanded by the grating, and the coating may thicken (e.g. linearly) with distance along the intermediate grating in the direction of light expansion to a thickness of about 30 nm.

The received light is laterally expanded by the intermediate diffraction grating by a process of diffraction. In particular, received light is diffracted into a $0^{th}$-order diffracted beam and a $1^{st}$-order diffracted beam. Light diffracted into the $0^{th}$-order beam continues its forward path without lateral deflection whereas in the $1^{st}$-order beam corresponds to deflected light which travels along the optical waveguide in a direction across the intermediate diffraction grating for further diffractive interactions with that grating. It is this $1^{st}$-order beam of the received light which supplies the light to be laterally expanded by the intermediate grating.

It is desirable to enhance the amount of light initially deflected into the $1^{st}$-order beam to enhance the amount of laterally expanded optical energy. To achieve this, the optical coating applied to the parts of the intermediate diffraction grating which initially receive light from the first diffractive grating region, is arranged to imbue the grating a relatively high diffractive efficiency there. This means that more optical energy is deflected, by diffraction, into the $1^{st}$-order diffraction beam such that a greater proportion of optical energy remains within the intermediate diffraction grating for subsequent lateral expansion by that grating. A selected proportion of the remaining optical energy is diffracted into the $0^{th}$-order beam for onward propagation along the optical waveguide to the output grating.

Figure 5A:
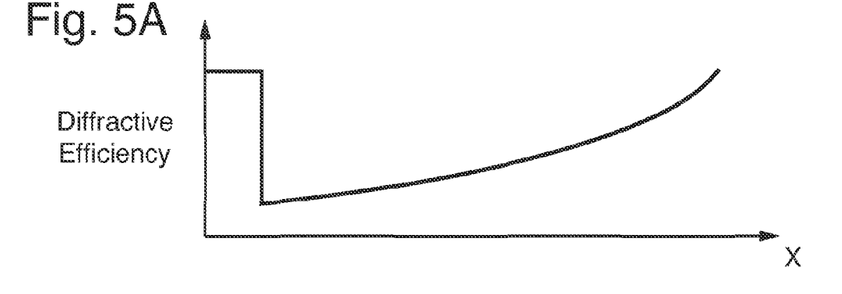
FIGS. 5A to 5C graphically illustrate a spatial distribution of diffraction efficiencies of diffractive gratings according to an embodiment of the invention.

The spatial arrangement of the optical coating of the intermediate grating varies across that grating in the direction of propagation of the initial $1^{st}$-order diffracted beam. In particular, the optical coating adjacent to the aforementioned parts of high diffractive efficiency is arranged to imbue a relatively low diffractive efficiency to the grating there. The coating is also arranged to vary to continuously increase the diffractive efficiency of the intermediate diffraction grating at increasing distance along the direction of propagation of the $1^{st}$-order beam. FIG. 5A graphically illustrates this, in which the parameter "x" of the ordinate corresponds to spatial position along the intermediate grating in the direction of propagation of the $1^{st}$-order beam.

This spatial distribution of diffractive efficiency enables approximately the same amount of optical energy to be deflected from the $1^{st}$-order beam towards the output grating at each diffractive interaction it undergoes with the intermediate diffraction grating. Multiple such interactions occur as the $1^{st}$-order beam propagates across that grating along the optical waveguide. In particular, at each such diffractive interaction the $1^{st}$-order beam is split into un-deflected optical energy ($0^{th}$-order locally) and into deflected optical energy ($1^{st}$-order locally). Deflected optical energy propagates along the optical waveguide towards the output diffraction grating. Consequently, a multitude of such diffractive interactions occurs as the propagating optical energy performs a multitude of successive total internal reflections whilst being guided along the optical waveguide across the intermediate diffraction grating. The un-deflected optical energy of the local $0^{th}$-order beam falls steadily with increasing diffractive interactions until the energy it conveys approximates the amount of energy it is desired to deflect into a $1^{st}$-order diffracted beam towards the output grating. The optical coating of the intermediate grating is arranged to imbue the grating with a high diffractive efficiency so as to deflect substantially all (or most) of the light from the local $0^{th}$-order beam there.

Figure 5B:
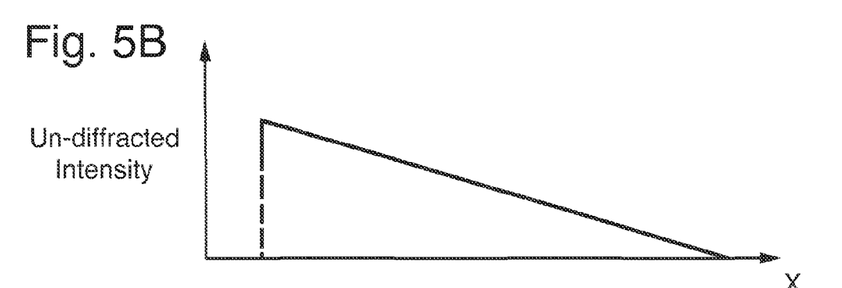
Figure 5C:
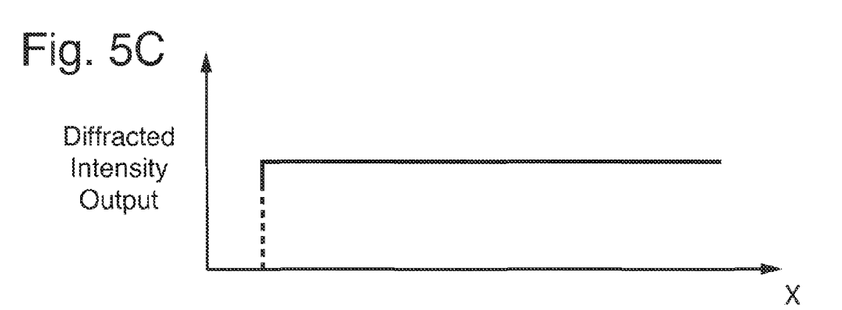

In this way the diffractive efficiency of the intermediate grating is high at the region where it initially receives light from the first diffractive grating region (8), it falls to a much lower efficiency immediately beyond that region whereupon it steadily rises with increasing distance from that region. This is shown schematically in FIG. 5A. The quantity of un-deflected energy propagating laterally across the intermediate grating is shown schematically in FIG. 5B, and the corresponding optical energy deflected from that laterally propagating beam, towards the second diffractive grating region (9), is schematically shown in FIG. 5C. A substantially uniform spatial distribution of optical energy is thereby expanded and directed to the second diffractive grating region for output from the optical waveguide.

Similarly an optical coating is applied non-uniformly to the second diffractive grating region so as to vary spatially the diffractive efficiency of the region along a direction. The direction corresponds to the dimension in which the diffractive grating region serves to expand light received from the intermediate diffraction grating (8). The optical coating is applied to make relatively low the diffractive efficiency of those parts of the second diffractive grating region adjacent to the intermediate diffraction grating. It is those parts of the second diffractive grating region which are arranged to receive diffracted light from the intermediate diffraction grating. The optical coating is controlled to imbue the second diffractive grating region with a diffractive efficiency that increases (for example, monotonically, such as linearly) with increasing distance along that grating region in the aforementioned direction. This assists in providing a substantially even distribution of optical energy output from the second diffractive grating region by diffraction. An increasing proportion of the optical energy of a guided light beam is diffracted out of the waveguide at each successive diffraction event with the second diffractive grating region as the amount of optical energy within the beam successively falls.

The diffractive efficiency of the second diffractive grating region (output grating) may be controlled to vary spatially by varying the thickness of the optical coating (9) applied to it to increase with increasing distance in the direction of light propagation through it from the intermediate grating. This variation may be linear with distance. This enables an increasing proportion of light from to be diffracted from a decreasing light supply as light propagates through the output grating and is increasingly diminished as it does. The result is a substantially spatially uniform output intensity of light in an output image derived from an input image having substantially uniform intensity across it. In other words, a source of potential distortion in the brightness distribution across the output image is suppressed or substantially removed.

It has been found that a number of important surprising effects flow from the process of generating the first and second diffractive grating regions from one common grating. These surprising effects provide several benefits which are discussed below. To assist in a better understanding of the possible origin of these effects, there follows a discussion of how the effects might arise. This discussion is not offered as a definitive explanation of the optical effects in question, but is proposed as an insight helpful to understanding.

The common grating structure (7) is generated by a process applied in unison to the first optical substrate (3) to generate simultaneously the first and second diffractive grating regions (8, 9) as well as the grating regions between them, in common. The grating structures of the first and second diffractive grating regions are substantially identical as a result. They may be regarded as identical optical scattering bodies.

Figure 6:
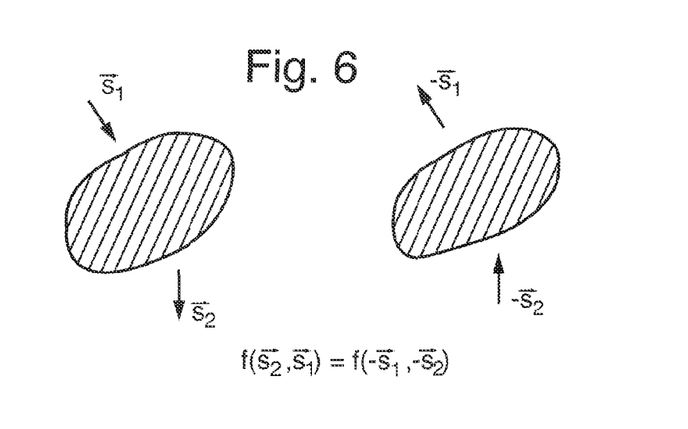
FIG. 6 schematically illustrates the correspondence of scattering amplitudes in accordance with the Reciprocity Relation.

The Reciprocity Relation is well established in optics and is discussed in detail in *Principles of Optics*, $7^{th}$ (expanded) edition, Max Born and Emil Wolf (Cambridge)—ISBN: 0521642221. This relation holds that the scattering amplitude (f) in a direction $s_2$, when a monochromatic plane wave of unit amplitude is incident on a scatterer in direction $s_1$, is equal to the scattering amplitude (f) in a direction $-s_1$, when a monochromatic plane wave of unit amplitude is incident on the same scatterer in direction $-s_2$. FIG. 6 schematically illustrates this relation.

Consider now that the first diffractive scattering region (8) of the common grating (7) is "the same scatterer" as the second diffractive grating region (9) of the common grating. Furthermore, due to the planar nature of the slab waveguide (2), the relative direction in which a $1^{st}$-order diffracted beam scatters from the first diffractive grating region is the reverse of the relative direction in which the same scattered beam strikes the second diffractive grating region. Thus, by reciprocity, the relative direction in which a $1^{st}$-order diffracted beam scatters from the second diffractive grating region will be opposite to the direction of the initial beam input to the first diffractive grating region.

The diffraction equations for the first and second diffractive grating regions are as follows:

$$\sin(\theta_e^1) - \sin(\theta_i^1) = m_1 \frac{d}{\lambda}, \text{ and}$$

$$\sin(\theta_e^2) - \sin(\theta_i^2) = m_2 \frac{d}{\lambda}$$

where $\theta_i^1$ is the angle of incidence of the initial beam into the first diffractive grating region and $\theta_e^1$ the angle at which the $1^{st}$-order diffracted beam exits that grating. Similarly, $\theta_i^2$ is the angle of incidence of the diffracted beam strikes the second diffractive grating region (the output grating) and $\theta_e^2$ the angle at which the $1^{st}$-order diffracted beam exits that grating. The quantity d is the grating pitch, common to both grating regions, and λ is the wavelength of the light in question. The integers $m_1$ and $m_2$ represent the order of diffraction of the beam diffracted by the first diffractive grating region along the waveguide, and by the second diffractive grating region out of the waveguide, respectively.

By geometry of the slab waveguide $\theta_e^1 = \theta_i^2$ and by reciprocity $\theta_i^1 = \theta_e^2$. Substituting these relations into the two grating equations above, and adding one to the other reveals:

$$0 = (m_1 + m_2)\frac{\lambda}{d}$$

to which the solution is $m_1 = -m_2$. Thus, the first and second diffractive grating regions are conjugated. That is to say, the order into which the second diffractive grating region diffracts light is opposite to the order into which the first diffractive grating region originally diffracted that light before it was received by the second diffractive grating region.

Figure 7:
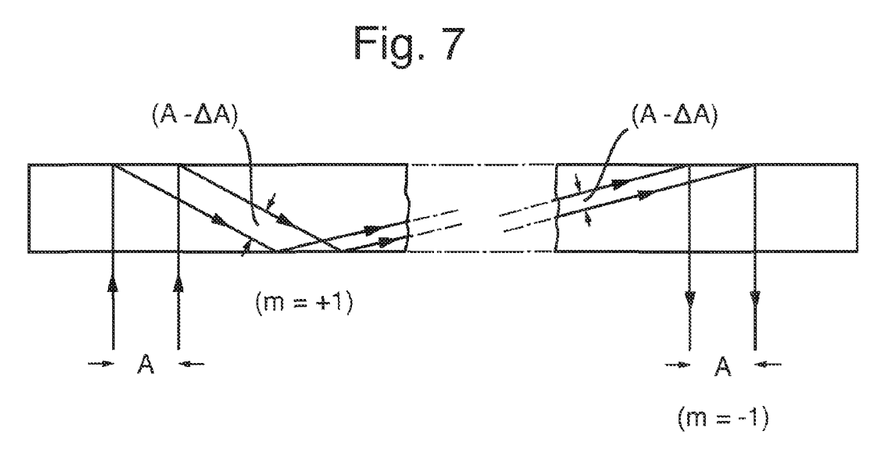
FIG. 7 schematically illustrates the effect of conjugated gratings with respect to geometric distortion.

Benefits of such conjugation include a reduction in geometric distortions imposed on image-bearing light by diffraction occurring at the first diffractive grating region. The conjugation of the second diffractive grating region has the effect of, to some extent, imposing geometric distortions in an opposite sense which serve to at least partly reversing the distortions imposed by the first diffractive grating region. FIG. 7 schematically illustrates this. An input beam has a cross-sectional area A. The $1^{st}$-order diffracted beam generated at the first diffractive grating region (8) has a cross-sectional area A-ΔA. Upon diffraction out of the waveguide by the second diffractive grating region (9), the cross-sectional area A is recovered.

Chromatic dispersion is also considerably reduced as a result of conjugation, and in practice is effectively substantially negated/removed. This is especially beneficial when a broadband optical source, such as an LED light source, is employed to generate the light input to the waveguide. As can be seen from the grating equations listed above, the angle of diffraction of light, into a given order of diffraction, is dependent upon the wavelength of that light. A diffracted beam from a broadband optical source may comprise an angular split/dispersion into constituent colours (a rainbow of colours)—particularly undesirable in image-bearing light. Longer wavelengths of light are deviated most by the diffraction into a given non-zero order, and shorter wavelengths less.

Figure 8:
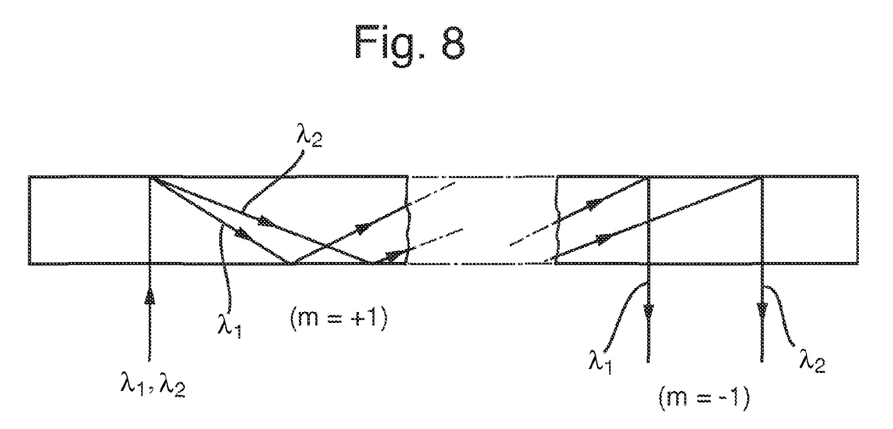
FIG. 8 schematically illustrates the effect of conjugated diffraction gratings with respect to chromatic dispersion.

Thus, for example, a $1^{st}$-order (m=1) beam may comprise a blue component deviated to one side of the $0^{th}$-order beam, with light of longer wavelengths adjacent to it on the same side (deviated more). A subsequent diffraction of that angularly dispersed beam by the output grating into a conjugate order (m=−1) has the effect of deviating the angularly dispersed beams in directions towards each other thereby to cause the output beams to be substantially parallel (as they were when they entered the waveguide) and thereby inhibit further angular spread compounding chromatic dispersion. FIG. 8 schematically illustrates this.

It is to be noted that the benefits of conjugated gratings such as this are not destroyed by the presence of the intermediate grating. It has been found that the common waveguide is more forgiving then prior art devices regarding slight misalignments in the orientation of the grating lines of the intermediate diffraction grating relative to the lines of the common grating structure.

Distortions in an output image tend to be less than those expected of prior art waveguides subject to similar misalignments. This may be the result of the conjugation described above.

Thus, optical waveguides are provided, and methods for its manufacture, which require the production of as few as two individual grating structures one of which, by processing, is formed into three diffraction gratings without the difficulties of aligning three separate gratings accurately or of providing accurately aligned edge reflection regions as in the prior art. Conjugation is a natural consequence with the benefits which flow from that. Although a few examples of the invention are described above for understanding, these are not intended to be limiting and it will be appreciated that modifications, alterations and variants to those examples such as would be readily apparent to the skilled person are encompassed within the scope of the invention as defined by the claims.

The invention claimed is:

1. An optical waveguide including:
    an optical substrate arranged to transmit light under total internal reflection;
    a first diffractive grating region associated with the optical substrate and arranged to receive light and to diffract the received light along the optical waveguide;
    an intermediate diffraction grating associated with the optical waveguide and optically coupled to the optical substrate and to the first diffractive grating region, arranged to receive light diffracted from the first diffractive grating region and to expand the received light in a first dimension by diffraction; and,
    a second diffractive grating region associated with the optical substrate and optically coupled to the intermediate diffraction grating, arranged to receive light expanded in the first dimension by the intermediate diffraction grating, to expand the received light in a second dimension orthogonal to the first dimension by diffraction and to output the light expanded in the first and second dimensions from the optical waveguide by diffraction,
    wherein the first diffractive grating region and the second diffractive grating region are diffractive regions of a common grating and the common grating and the intermediate diffraction grating are separate integers.

2. The optical waveguide according to claim 1, in which the common grating includes a substantially non-diffractive grating region comprising parts of the common grating processed to substantially suppress diffraction thereby.

3. The optical waveguide according to claim 2, in which the substantially non-diffractive grating region has an optically transmissive coating which substantially suppresses diffraction by the parts of the common grating coated thereby.

4. The optical waveguide according to claim 3, in which the optically transmissive coating has a refractive index which substantially matches the refractive index of the optical substrate.

5. The optical waveguide according to claim 1, in which the second diffractive grating region has an optical coating having a refractive index which differs from the refractive index of the optical substrate.

6. The optical waveguide according to claim 1, in which the first diffractive grating region has an optical coating having a refractive index which differs from the refractive index of the optical substrate.

7. The optical waveguide according to claim 5, in which the optical coating of the second diffractive grating region is over-coated by said optically transmissive coating.

8. The optical waveguide according to claim 6, in which the optical coating of the first diffractive grating region is over-coated by said optically transmissive coating.

9. The optical waveguide according to claim 7, comprising a laminate of layers of optically transmissive material within which some or all of the common grating is contained, wherein one of the layers of optically transmissive material bears the common grating.

10. The optical waveguide according to claim 3, in which the external surface of the optically transmissive coating is substantially coplanar with an opposite surface of the optical waveguide.

11. The optical waveguide according to claim 3, in which the intermediate diffraction grating and parts of the common grating coated by the optically transmissive coating overlap.

12. The optical waveguide according to claim 1, in which the intermediate diffraction grating is a surface relief grating formed in a surface of the optical waveguide.

13. The optical waveguide according to claim 1, in which the first diffractive grating region and the second diffractive grating region are each a relief grating.

14. The optical waveguide according to claim 12, in which the common grating comprises a blazed grating structure and the intermediate diffraction grating comprises a square-wave grating structure.

15. The optical waveguide according to claim 1, in which the second diffractive grating region and the first diffractive grating region share a substantially identical grating structure.

16. The optical waveguide according to claim 1, in which the optical waveguide is a planar waveguide and the first and second dimensions are dimensions in the plane of the planar waveguide.

17. A display device including the optical waveguide of claim 1.

18. A method of manufacturing an optical waveguide including:
   forming a common grating in an optical substrate;
   applying a process to the common grating to define a first diffractive grating region and a second diffractive grating region which are diffractive regions of the common grating; and
   forming as part of the optical waveguide an intermediate diffraction grating which is separate from the common grating and which is optically coupled to the first and second diffractive grating regions and to the optical substrate,
   wherein the first diffractive grating region is arranged to receive light and diffract the received light along the optical waveguide, and the intermediate diffraction grating is arranged to receive diffracted light from the first diffractive grating region and to expand the received light in a first dimension by diffraction, and the second diffractive grating region is arranged to receive the light expanded in the first dimension and to expand the light in a second dimension orthogonal to the first dimension by diffraction and to output the received expanded light from the optical waveguide by diffraction.

19. The method according to claim 18, including applying a said process to parts of the common grating to substantially suppress diffraction by the processed parts and to define the first and second diffractive grating regions of the common grating as regions other than the processed parts.

20. The method according to claim 19, in which the process includes coating the parts of the common grating with an optically transmissive material therewith to substantially suppress diffraction by the coated parts.

21. The method according to claim 20, in which the optically transmissive coating has a refractive index which substantially matches the refractive index of the material of the optical substrate.

22. The method according to claim 18, including coating the first diffractive grating region of the common grating with an optical coating having a refractive index which differs from the refractive index of the material of the optical substrate.

23. The method according to claim 18, including coating the second diffractive grating region with an optical coating having a refractive index which differs from the refractive index of the material of the optical substrate.

24. The method according to claim 23, including overcoating the optical coating of the second diffractive grating region with the optically transmissive coating.

25. The method according to claim 23, including overcoating the optical coating of the first diffractive grating region with the optically transmissive coating.

26. The method according to claim 19, including forming the intermediate diffraction grating to overlap said processed parts of the common grating.

27. The method according to claim 18, including forming the intermediate diffraction grating as a surface relief grating.

28. The method according to claim 18, including forming the common grating as a surface relief grating.

29. The method according to claim 18, including forming the common grating by a process applied in unison to the first and second diffractive grating regions substantially simultaneously.

* * * * *